(12) United States Patent
Pena Campos et al.

(10) Patent No.: US 11,044,121 B2
(45) Date of Patent: Jun. 22, 2021

(54) MULTICARRIER COMMUNICATION SYSTEM FOR DOUBLY SELECTIVE CHANNELS USING VIRTUAL TRAJECTORIES RECEIVER

(71) Applicant: Centro De Investigation Y De Estudios Avanzados Del Instituto Politecnico Nacional, Mexico D.F. (MX)

(72) Inventors: Fernando Pena Campos, Guadalajara (MX); Valeri Kontorovich Mazover, Mexico City (MX); Ramon Parra Michel, Zapopan (MX)

(73) Assignee: Centro de Investigation y de Estudios Avanzados del Instituto Politecnico Nacional, Mexico City (MX)

( * ) Notice: Subject to any disclaimer, the term of this patent is extended or adjusted under 35 U.S.C. 154(b) by 0 days.

(21) Appl. No.: 15/756,109

(22) PCT Filed: Aug. 31, 2016

(86) PCT No.: PCT/IB2016/055184
§ 371 (c)(1),
(2) Date: Feb. 28, 2018

(87) PCT Pub. No.: WO2017/037623
PCT Pub. Date: Mar. 9, 2017

(65) Prior Publication Data
US 2018/0309598 A1    Oct. 25, 2018

(30) Foreign Application Priority Data

Aug. 31, 2015 (MX) .................. MX/a/2015/011471
Aug. 31, 2015 (MX) .................. MX/a/2015/011472

(51) Int. Cl.
*H04L 25/02* (2006.01)
*H04L 25/03* (2006.01)
(Continued)

(52) U.S. Cl.
CPC ...... *H04L 25/0222* (2013.01); *H04L 25/0224* (2013.01); *H04L 25/0242* (2013.01);
(Continued)

(58) Field of Classification Search
CPC ... H04L 5/0222; H04L 5/0224; H04L 5/0242; H04L 5/0244; H04L 5/0248;
(Continued)

(56) References Cited

U.S. PATENT DOCUMENTS

| 9,374,143 | B2* | 6/2016 | Giannakis | .............. H04B 7/046 |
| 2014/0169501 | A1* | 6/2014 | Nazarathy | .......... H03H 17/0266 |
| | | | | 375/316 |
| 2018/0145770 | A1* | 5/2018 | Oelze | ..................... H04B 11/00 |

OTHER PUBLICATIONS

Kim et al., "Data Detection for Doubly-Selective MIMO Channels Using Decision-Directed Channel Tracking and Exponential Basis Models", 2008, IEEE Communications Society, IEEE "GLOBECOM" 2008, pp. 1-6 (Year: 2008).*

(Continued)

*Primary Examiner* — Paul H Masur
(74) *Attorney, Agent, or Firm* — IP Law Leaders PLLC; Andrew C. Aitken

(57) ABSTRACT

A modified orthogonal frequency-division multiplexing (OFDM) communication system based on virtual decomposition of the channel is proposed. The system is fully compatible with standard OFDM transmitters and maintains several blocks of standard OFDM receivers. The proposed approach achieves also incoherent reception of multicarrier signals even with a simple autocovariance DPSK detector. This novel system substantially surpasses the performance of current approaches while requiring low computational (Continued)

complexity. Two preferred embodiments are described; one with coherent reception using pilot signals, and the second with incoherent receiver of differentially encoded signals.

18 Claims, 5 Drawing Sheets

(51) Int. Cl.
  *H04L 5/00* (2006.01)
  *H04L 27/26* (2006.01)
(52) U.S. Cl.
  CPC ...... *H04L 25/0244* (2013.01); *H04L 25/0248* (2013.01); *H04L 25/03159* (2013.01); *H04L 5/0048* (2013.01); *H04L 27/2697* (2013.01)
(58) Field of Classification Search
  CPC ............... H04L 5/03159; H04L 5/0048; H04L 25/0222; H04L 25/0224; H04L 25/0242; H04L 25/0244; H04L 25/0248; H04L 25/03159
  See application file for complete search history.

(56) References Cited

OTHER PUBLICATIONS

Kim et al., "Recursive least-squares decision-directed tracking of doubly-selective channels using exponential basis models", Apr. 24, 2009, 2009 IEEE International Conference on Acoustics, Speech and Signal Processing, pp. 1-4 (Year: 2009).*

Pena-Campos et al., "A Low Complexity Multi-Carrier System Over Doubly Selective Channels Using Virtual-Trajectories Receiver", Aug. 2016, IEEE Transactions On Wireless Communications, vol. 15, No. 8, pp. 1-12 (Year: 2016).*

* cited by examiner

MULTICARRIER COMMUNICATION SYSTEM FOR DOUBLY SELECTIVE CHANNELS USING VIRTUAL TRAJECTORIES RECEIVER

FIELD OF THE INVENTION

The technical field of this invention refers to the multicarrier wireless communication systems capable of deal with doubly selective channels, employing either coherent or incoherent reception of virtual trajectories.

DESCRIPTION OF THE RELATED ART

In the last years, wireless communications had experienced a dramatic grow in terms of demand and variety of use. Most of the modern devices for personal assistance like PDA's, smart phones, tablets, laptops etc., make use of wideband wireless links that connect them to different kinds of networks with link coverage from few meters up to some kilometers. There is a recent emergence of new communication standards designed to afford high definition multimedia and storage devices over wireless links that require data rates in the order of hundreds of megabits per second (Mbps). There is also an increasing interest for the underwater acoustic systems. These systems ease a variety of activities, e.g., communication with network sensors, voice and image interchange between base stations and divers. As a consequence, providing tools to exploit the scarce available bandwidth is a topic of high interest.

The foregoing communication links involve a variety or surrounding conditions that imply different challenges for the transceivers. The environment objects, mobility and carrier frequency play a significant role on the propagation phenomena and overall system performance. Additionally, the increased number in mobile devices operating in the same region forces the communication system not only to overcome the challenging propagation circumstances, but also to operate with high spectral efficiency in order to exploit the limited available bandwidth. Nowadays, the digital signal processing (DSP) theory has become a powerful tool to bring theoretical results into real applications for dealing with these challenging channels.

Explicitly, the technical problem we tackle lies on the necessity of transmitting data with high speed over doubly selective channels, while at the same time keeping reasonable spectral efficiency. This two conditions forces single carrier (SC) and orthogonal frequency division multiplexing (OFDM) systems to work under high interference conditions. In the case of SC wideband radio communications, the delay spread is so large that the inter-symbol interference (ISI) covers several symbols. In the case of OFDM based systems, Doppler spread introduces intercarrier interference (ICI), which usually covers several carriers.

Restricting the analysis to the case of block-type transmissions, either ICI in OFDM or ISI in SC become equivalent problems, so similar techniques have been developed in order to combat them. However, overall interference introduced by the DSC in the data symbols is commonly less severe in the OFDM system, as it exhibits rapid decay of interference contribution with respect to the symbol distance in SC systems; therefore, this work is focused on the operation of OFDM systems in DSC. In this context, there are two main approaches for dealing with transmission over DSC: a) Transmitting the traditional OFDM signals while increasing the complexity in the receiver (Rx) and b) Devising novel systems specifically designed to operate over DSC.

In the first case, two main problems are addressed: estimation of channel parameters and data estimation or equalization (EQ). In channel estimation (CE), the computation of the time-varying impulse response is required, which is usually driven as a linear inverse problem. The main issue consists of handling the huge quantity of parameters that the channel has in its original form. In order to simplify this task, different approaches can be found in the literature, such as piecewise linear models, truncating of channel matrices (TCM), basis expansion modeling (BEM), auto-regressive modeling (AR), and mixed approaches. The piecewise linear approaches assume that variations of the channel impulse response (CIR) during an OFDM symbol can be approximated by a first-degree polynomial; thus, the CIR of a given OFDM symbol can be computed by performing a linear interpolation using the estimated CIR of its adjacent symbols [1]. In the case of TCM, the quasi-sparse form of the channel matrix in either frequency or time is exploited by using an approximated matrix with only a few diagonals different from zero [2], [3]. This approach can be enhanced by means of frequency filtering, i.e, time windowing, which allows for an equivalent model with better concentration of the process energy in the main diagonals [4]. The required window is constructed from the second order statistics of the channel process. Nowadays, one of the most popular tools is BEM, where the channel is represented through a reduced set of orthogonal functions [5,6]. Although the optimum solution in terms of minimum amount of functions with the least modeling error requires knowledge of the second order channel statistics, it has been shown that it is only necessary to know the maximum Doppler and delay dispersion values in order to generate an appropriate base [5]. The evolution of channel coefficients can be fitted into an AR Markov process, where state-space techniques such as the Kalman filter can be used for estimation-prediction [7], [8]. Finally, a combination of the above models has also been used. These approaches include AR modeling applied to the BEM coefficients [9] and truncation of the BEM channel reconstruction [4]. Another approach is to exploit the coding stages by iterating among CE, soft detection, and decoding in order to provide the CE with extra information from the recovered data symbols [10].

Compensation of the DSC represents the main problem in the Rx, mostly due to the computational complexity involved. While some computations can be performed offline in the case of CE, most of the EQ processes in the current approaches are realization-dependent, which means that no savings are made a priori. The main purpose of the equalizer is to collect the Doppler dispersion in order to exploit the implicit diversity. The state-of-the-art algorithms include linear equalizers, such as least squares (LS) and linear minimum mean squared error (LMMSE) [11]. The performance of these approaches is usually lower than that of their non-linear competitors, but in most cases the computational structure is simpler. Other approaches use non-linear processing and exploit the finite cardinality of the transmitted data and bounded length of ICI/ISI, i.e., truncated channel matrix. For example, in the decision feedback equalizers (DFE) [12], the computation of data estimates is performed element-wise; the information of previous symbols is then used as a priori on the remaining symbols. This category covers the so-called ISI/ICI-cancelers [11], which are in fact DFEs with reordered symbols. The performance of this equalizer is better than that of LMMSE, but the computational complexity is greater. Although maximum likelihood (ML) is the best criterion for data detection, its computational complexity makes it infeasible, as it represents a brute-force search. To compensate for this, near-ML approaches have been developed where some techniques of hierarchical search are used to reduce the solution possibilities [13], as well as the computational complexity. The price is a performance reduction with respect to the ML equalizer and the possibility of obtaining error bursts in the detected sequences. Also, unlike the abovementioned approaches, the execution time of Near-ML algorithms is, in most cases, dependent not only on the on the channel realization and instantaneous signal to noise ratio (SNR) but also on the constellation size. The scope of communication systems specifically designed to operate in DSC is reduced and two main approaches can be found: non-biorthogonal multicarrier modulation (MSTPMCM) and linear precoding. MSTP-MCM extends the conventional multicarrier system to introduce a shape filter in the transmitter (Tx) and its respective matched filter in the Rx [14]. In this case, the transmitted signal is composed of a sum of overlapped blocks with a shaping window. The main objective in this approach is to avoid windowing on the Rx, which usually results in coloring of noise. The biggest sacrifice in this approach is a loss of compatibility with OFDM symbols and the lack of orthogonality in the transmitted waveforms, even in non-DSC.

Finally, other inventions include differential coding on the transmitter in order to perform incoherent detection in the receiver side. For frequency-selective channels with coherence time sufficiently large to cover several OFDM blocks, each carrier experiments constant or quasi-constant channel transfer function (CTF) during several symbols. Taking advantage of this property, it is possible to employ differential phase shift keying DPSK individually on each sub-carrier over the time (TD-OFDM) as in [15]. If in the opposite way, the channel variations are faster and the CFT is constant in ranges of two or more subcarriers, DPSK coding can be performed for each OFDM block independently in the frequency domain (FD-OFDM) [15]. These approaches work well in channels with medium Doppler dispersions; however, in a DSC the subcarrier orthogonality may be corrupted inducing intercarrier interference (ICI). In order to solve this, the channel BEM can be used to design a DPSK signal that collects the diversity offered by Doppler and delay spread. Following this approach [16,17] propose a communications system to achieve diagonalization of the double selective channel using the harmonically related complex exponentials for the time BEM. This technique as of now is the better solution for incoherent reception under DSC. However, there are some disadvantages that make this approach inappropriate in some cases, e.g., the diagonalized models in [17] require low modeling error in the CE-BEM, which as shown in [18] requires either large symbols or amount of coefficients in order to compensate for the Gibb's phenomenon. One of the issues with this approach is the questionable fitting of complex exponentials to expand the channel, and most importantly, the spectral efficiency loss in the inter-block and sub-block guards. This penalization increases significantly with the channel delay spread, which means low spectral efficiency in channels with high delay-spread.

Since the multicarrier systems became popular the last decades, particularly OFDM. There is a great amount of inventions related to this topic, only few of them dedicated to compensate doubly selective channels yet. Inventions related with this work are briefly listed here. In U.S. Pat. Nos. 8,374,266 and 8,989,311 channel estimators for DSC are proposed. The method-apparatus has the disadvantage of requiring multiple executions of the estimation process in order to obtain useful accuracy which takes high computational complexity, additionally, these inventions cover only the problem of channel estimation but no equalization or ICI mitigation is solved. Inventions described in U.S. Pat. Nos. 8,705,642, 7,433,419 and US20080101484 propose ICI cancellation methods in OFDM systems for doubly selective channels. These three inventions require the computation of equalizer matrix or filter which is obtained by a very complex process of inverting the channel matrix in the receiver. This process is highly expensive and susceptible of particular channel realization, making these approaches unpractical for real time execution.

The invention described in US20140105315 specifies a communication system for doubly selective channels using multiple stages of DFT precoding. The structure of such signal construction implies a great amount of bandwidth wasted in cyclic guards, yet is not compatible with current OFDM modern architectures.

SUMMARY OF THE INVENTION

This invention comprises a novel multicarrier communication system with low complexity that allows data transition in different propagation conditions: flat channel with additive White Gaussian noise, frequency selective channels, time-varying channels, and frequency-time selective channels (doubly selective). The embodiments of this invention include both coherent and incoherent receivers. Differently from the conventional communication techniques, the proposed system achieves operation on doubly selective channels with very low complexity while providing high performance in terms of bit error rate (BER). This system is also robust to the exact knowledge of the channel statistics. Mainly, the exclusive use of virtual trajectories allows this system to skip matrix inversions or iterative channel equalizers. The lineal based algorithms involved in the receiver enable linear precoders that exploit the channel diversity in both, delay-time and Doppler-frequency with simple computations.

The embodiment of this system with incoherent receiver simplifies even more the reception and decoding of data, providing a suitable solution in environments were the transmission of pilot signals is prohibitive The result is a novel and versatile modified OFDM system that operates efficiently in DSC.

The transmitter is fully compatible with the classical OFDM structure, while the receiver preserves some of the most important features, such as one-tap CE and EQ. For these reasons, the proposed approach emerges as the first communication system for the DSC that solves the ICI/ISI without direct estimation of time-varying CIR matrices nor inversion of these. Additionally, the proposed transmitted signal may also be recovered without extra stages by a conventional OFDM system under low Doppler scenarios.

These characteristics make the proposed invention to surpass undeniably the results obtained with other known techniques, providing significant advantages in terms of simplicity of implementation and performance mainly in DSC. Among other unavailable results in the conventional designs, our system surpasses the designs based on OFDM with non-linear equalizers like ML or DFE. The presented results also indicate that the proposed system is able to exploit the diversity available in doubly selective Rayleigh channels. Overall performance of the proposed communication system with coherent receiver and DFT spreading behaves near the performance expected in the AWGN channel case, as each symbol experiments instantaneous SNR similar to the average. In the case of the incoherent receiver, the transmitter architecture is equal to a conventional FD-OFDM which makes this approach attractive. In the receiver, the additional computations compared with conventional OFDM are minimal. Furthermore, the receiver's main components are still FD-OFDM compatible. The proposed virtual trajectory receiver is then a simple solution to incorporate high performance incoherent reception in DSC to the existent OFDM-DPSK systems with minimal computational costs on both transmitter and receiver.

In the embodiment of the system with coherent reception the transmitter consists on bit input data, an optional DFT-precoder connected directly with an OFDM base band processor whose carrier assignation is modified, such processor is connected to a digital-analog interface that perform the required coupling to the signal in order to transmit in the specific propagation media (electromagnetic waves, acoustic waves, etc.). The digital signal processing is performed with a general purpose processor, a reprogrammable device like a FPGA or by means of the implementation of the described algorithms in a dedicated ASIC. The analog interface is not object of this invention but is understood that this can contemplate any coupling to the propagation media.

The coherent receiver is constituted by an analog interface with the necessary blocks for the detection of the signal from the propagation media. Followed by a block of digital coupling that delivers the signals to the virtual trajectories base band processor here proposed. This processor performs the algorithms on the digital signals that recover the transmitted bit stream.

The baseband receiver itself can perform several processing configurations. In the first, the receiver used virtual trajectory estimation, and in the second as a conventional OFDM receiver. Both configurations can be perform by a single embodiment with the capability of switching between functionality modes depending either the channel is fast or slow time-variant.

In the embodiment of the system with incoherent reception the transmitter comprises a bit stream data input, a differential encoder connected directly to an OFDM base band processor whose subcarrier mapping stage is modified, such processor is connected to an digital-analog interface that performs the necessary conditioning on the signal to allow transmission in the specific propagation media (electromagnetic waves, acoustic waves, etc.). The digital signal processing is performed with a general purpose processor, a reprogrammable device like a FPGA or by means of the implementation of the described algorithms in a dedicated ASIC. The analog interface is not object of this invention but is understood that this can contemplate any coupling to the propagation media.

The incoherent receiver comprises an analog interface with the necessary blocks for the detection of the signal from the propagation media. Followed by a block of digital coupling that delivers the signals to the base band virtual trajectories processor here proposed. This processor performs the algorithms on the digital signals that recover the transmitted bit stream. The baseband receiver itself can perform several processing configuration. In the first, the receiver used virtual trajectory estimation and differential detection with combining and in the second as a conventional OFDM receiver with incoherent detection. Both configurations can be performed by a single embodiment with the capability of switching between functionality modes depending either the channel is fast or slow time-variant.

DETAILED DESCRIPTION OF THE INVENTION

Figure 1:
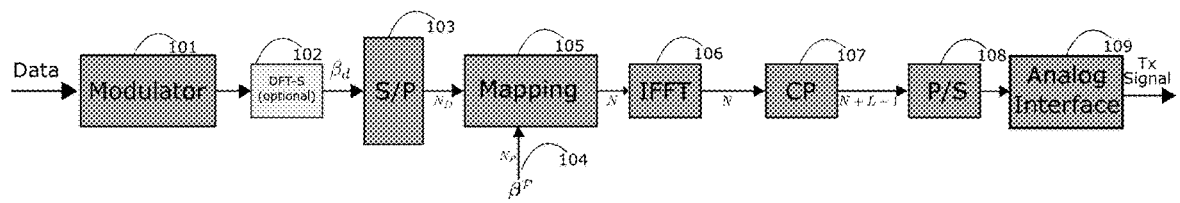
FIG. 1. Shows a block diagram with the proposed coherent multicarrier transmitter FIG. 2. Shows a block diagram with the proposed coherent multicarrier receiver FIG. 3. Shows a block diagram with the channel estimation module of the proposed coherent receiver.

System Model.

Assume a system with bandwidth $F_S$ and block transmission with inter-block time-guard interval (cyclic prefix) sufficiently large to absorb the equivalent CIR and avoid inter block interference (IBI); then, the input-output (I/O) signal model for a specific block passed through the DSC in the complex base band representation can be expressed as:

$$y[n] = \sum_{l=0}^{L-1} h[n, l]x[\langle n - l \rangle_N] + w[n], n = 0, 1, \ldots, N - 1 \quad (1.1)$$

where x[n] is the transmitted signal, h[n,l] is the time-varying CIR, N is the block length excluding guard band, and w[n] is the delta-correlated complex white noise with variance $\sigma_w^2$. As usual, CIR is considered below a finite delay spread $\tau_{max}$ or equivalently L taps that contain most of the process energy. Now, the random process h[n,l] is exchanged for a 2D-BEM with finite amount of coefficients in the form:

$$h[n, l] = \sum_{m=0}^{M-1} \alpha_m \phi_m[n, l] + \varepsilon[n, l], \quad (1.2)$$

where $\phi_m[n,l]$ and $\alpha_m$ are the m-th basis function and its corresponding coefficient, respectively, while $\varepsilon[n,l]$ represents the modeling error. The optimal basis comes from the solution of the 2D eigen-decomposition of the 4D time-frequency correlation function. The Karhunen-Loéve expansion provides an optimal basis in the mean squared error (MSE), but does not represent a robust solution, as it requires precise knowledge of the second order channel statistics. For this reason, and based on the assumption that only maximum dispersion parameters are known, the scattering function of the DSC can be considered to lie within a deterministic delay-Doppler function, such as a rectangular boxcar shaped kernel. The eigen-functions of this kernel are then a set of 2D prolate spheroidal wave functions, which are composed of the external product of two sets of 1D prolates, one for expanding the delay-spread and other for expanding the Doppler spread domains [19].

Note that this result is equivalent to exploiting the separability of the kernel, and then performing the eigendecomposition on each domain separately. Such a set of bases has the main advantage of reproducing realizations from any scattering function with low error whose dispersion parameters lie within the design bounds [20], which also applies to non-separable kernels where correlation among the weighting factors may occur. For underspread channels, i.e. $\tau_{max}f_D \ll 1$, the amount of parameters $M_\tau \times M_D$ needed to provide a good approximation is commonly much less than those required by the discrete baseband CIR. Note that this model can be applied to wide sense stationary uncorrelated scattering channels (WSUSS) as well as to non-WSUSS channels if upper bounds on the local scattering function are considered.

Applying this separation of domains to (1.2) gives the CIR expansion as:

$$h[n, l] = \sum_{q=0}^{M_D-1} \sum_{r=0}^{M_\tau-1} \alpha_{q,r} \phi_q^I[n] \phi_r^{II}[l] + \varepsilon[n, l], \quad (1.3)$$

where $\{\phi_q^I[n], \forall q \in [0, M_D-1]\}$, $\{\phi_r^{II}[l], \forall r \in [0, M_\tau-1]\}$ are the Doppler and Delay BEM, which in the discrete case are the so called discrete prolate spheroidal sequences (DPSS), computed as the solution of [20]:

$$\sum_{n'=0}^{N-1} \frac{\sin(2\pi f_D N(n' - n))}{\pi(n' - n)} \phi_q^I[n'] = \lambda_q \phi_q^I[n] \text{ and} \quad (1.4)$$

$$\sum_{l'=0}^{L-1} \frac{\sin(\pi F_s \tau_{max}(l' - l))}{\pi(l' - l)} \phi_r^{II}[l'] = \lambda_r \phi_r^{II}[l], \quad (1.5)$$

with double indexed BEM coefficients obtained as follows:

$$\alpha_{q,r} = \sum_{n=0}^{N-1} \sum_{l=0}^{L-1} h[n, l] \phi_q^{I*}[n] \phi_r^{II*}[l] \quad (1.6)$$

The eigenvalues $\lambda_q$ and $\lambda_r$ vanish beyond the time duration-bandwidth product of the process, so the approximated dimensionality or amount of basis functions to be used in each domain is:

$$M_\tau = \lceil F_S \tau_{max} \rceil + 1, \quad (1.7)$$

$$M_D = \lceil 2f_D N/F_S \rceil + 1. \quad (1.8)$$

The modeling error $\varepsilon[n,l]$ will be omitted from this point onwards, given that enough functions are considered in the approximation. The 2D basis allows the inclusion of more system specifications, such as effective bandwidth and form/match filter shapes in the BEM model, which reduces modeling error in the time delay domain. In other words, (1.3) is a generalized form of the 1D BEM used in [21] since the time delay basis is not restricted to the canonical form.

For simplicity, the presented work is limited to linear modulation schemes, i.e., those where the transmitted signal is composed of the combination of a weighted collection of functions in the form:

$$x[n] = \sum_{i=0}^{N_I-1} \beta_i s_i[n], \quad (1.9)$$

where $\{s_i[n], \forall i \in [0, N_I-1]\}$ is the set of transmitted functions in a single block and $\beta_i$ is the data symbol carried by the i-th function. The complete model is then obtained by substituting (1.3) and (1.9) in (1.1), leading to:

$$y[n] = \sum_{l=0}^{L-1} \left[ \sum_{q=0}^{M_D-1} \sum_{r=0}^{M_\tau-1} \alpha_{q,r} \phi_q^I[n] \phi_r^{II}[l] \sum_{i=0}^{N_I-1} \beta_i s_i[\langle n - l \rangle_N] \right] + w[n] \quad (1.10)$$

By concentrating the functions known in the Rx in a single term:

$$s_i^{(q,r)}[n] = \phi_q^I[n] \sum_{l=0}^{L-1} \phi_r^{II}[l] s_i[\langle n - l \rangle_N], \quad (1.11)$$

and substituting it in (1.10), the following model is obtained:

$$y[n] = \sum_{q=0}^{M_D-1} \sum_{r=0}^{M_\tau-1} \sum_{i=0}^{N_I-1} \beta_i \alpha_{q,r} s_i^{(q,r)}[n] + w[n]. \quad (1.12)$$

Using this orthogonal representation of the channel is equivalent to decomposing it in virtual trajectories, which offers a reduced parameter representation. It is important to highlight that up to this point, no critical assumptions about the channel have been made, and because of this, the presented model is still fairly generic for most practical scenarios.

Modified OFDM System.

It is clear that the DSC provides both time and frequency diversity; therefore, trying to exploit it with an appropriate low complexity system is a worthwhile effort. A solution focused in this direction is introduced in this paper; it mainly consists of a system that considers the transmission of signals through independent paths and a combiner of the received replicas. In the following sections, this novel system is explained in detail.

Transmitter.

By observing (1.12) it is possible to infer that a total of $M_D M_\tau N_I$ different signals arrive at the Rx. Considering that there are N samples, the Tx can send $N/(M_D M_\tau)$ functions at most in order to keep low interference between them in the Rx. This value decays rapidly with the increase of $M_D$ and $M_\tau$ which forces the constellation size to grow significantly in order to maintain the system throughput. That said, the first consideration is to look for a set of transmission functions that allows the diversity in one of the domains to be automatically collected by one of the linear operators in (1.12), i.e., a set of functions immune to the interference given by the dispersion phenomena in one of the considered domains. This way, the receiver's task will be to distinguish and split a fewer number of different functions (N times either $M_D$ or $M_\tau$) and the Tx will be capable of sending a higher multiplexing order with low interference levels.

It can be proven that a particular solution to this problem is to use harmonically related complex exponentials. Note that (1.11) can be interpreted as a frequency selective time invariant channel followed by a windowing. The latter yields the solution of using OFDM as Tx prototype model, since it has the desired property of collecting multipath in the Rx side. Let the transmitted set of functions be:

$$s_i[n] = e^{j2\pi k_i n/N}, \quad (1.13)$$

where $k_i$ is an integer (negative or positive) used to map data to an specific digital frequency. Then, the following simplifications can be made in (1.11):

$$s_i^{(q,r)}[n] = \phi_q^I[n] \sum_{l=0}^{L-1} \phi_r^{II}[l] e^{j2\pi k_i(n-l)/N} \quad (1.14)$$

$$s_i^{(q,r)}[n] = \phi_q^I[n] s_i[n] \varphi_r^i, \text{ where} \quad (1.15)$$

$$\varphi_r^i = \sum_{l=0}^{L-1} \phi_r^{II}[l] e^{-j2\pi k_i l/N} \quad (1.16)$$

is a constant known by the Rx, since it depends only on the subcarrier index and time delay basis functions. By using (1.15) the received signal model in is rewritten as:

$$y[n] = \sum_{q=0}^{M_D-1} \sum_{i=0}^{N_I-1} \vartheta_q^i \psi_q^i[n] + w[n] \text{ where} \quad (1.17)$$

$$\vartheta_q^i = \beta_i \sum_{r=0}^{M_\tau-1} \alpha_{q,r} \varphi_r^i, \quad (1.18)$$

$$\psi_q^i[n] = \phi_q^I[n] s_i[n]. \quad (1.19)$$

Given that the basis functions are the DPSS defined over [0, L−1], (1.16) is nothing but the zero-padded length N DFT of $\phi_r^{II}[n]$ evaluated in $k_i$. Remembering that $s_i[n]$ are complex exponential functions, it results that $\{\Psi_q^i[n], \forall q \in [0, M_D-1]\}$ in (1.19) is actually the so called set of modulated spheroidal prolate functions [22], i.e., prolate basis shifted in frequency domain that still maintain orthogonallity. In other words, all $\Psi_q^i[n]$ with the same super-index i are orthogonal. This property guarantees at the Rx side that each virtual-trajectory (VT) of a particular subcarrier is orthogonal to the other trajectories of the same subcarrier.

The last design decision consists of the amount of sub-carriers and their frequencies to be used, i.e., the mapping rule $k_i$. Given that the energy of $\Psi_q^i[n]$ is concentrated around the transmitted subcarrier (property of modulated spheroidal functions), a natural solution is to place $\lfloor NM_D \rfloor$ uniformly distributed subcarriers. For an even block length N, the mapping rule can be selected as:

$$k_i = iM_D - N/2. \quad (1.20)$$

This provides the maximum euclidean distance between intercarrier trajectories with admissible ICI, while covering the available bandwidth. The amount of subcarriers $N_I = \lfloor N/M_D \rfloor$ is a convenient solution for avoiding ill-conditioning of the virtual trajectories separator in Rx. It will be illustrated in the following subsections that this transmitted signal allows the Rx to operate over DSC without requiring multi-tap equalizers, and thus, avoids the necessity for a solution of linear systems in execution-time (e.g. matrix inversions and iterative equalizers).

Optimum Coherent Detection.

Exploiting the linear structure of (1.17), it is possible to obtain a more convenient matrix form:

$$y = \Psi\vartheta + w, \quad (1.21)$$

where $$y = [y[0] y[1] \ldots y[N-1]]^T \quad (1.22)$$

$$w = [w[0] w[1] \ldots w[N-1]]^T \quad (1.23)$$

matrix $\Psi$ of size $N \times M_D N_I$ is constructed as:

$$\Psi = [\Psi_0 \Psi_1, \ldots \Psi_{M_D-1}] \quad (1.24)$$

with each of the inner matrices $\Psi_q$ containing the subcarriers belonging to the q-th Doppler trajectory in the form:

$$[\Psi_q]_{n,i} = \Psi_q^i[n], \quad (1.25)$$

n=0, 1, ... N−1, i=0, 1, ... $N_I$−1, $\vartheta$ is a vector with the trajectory coefficients:

$$\vartheta = [\vartheta_0^T \vartheta_1^T \ldots \vartheta_{M_D-1}^T]^T \quad (1.26)$$

and $\vartheta_q$ is a vector with elements:

$$\vartheta_q = [\vartheta_q^0 \vartheta_q^1 \ldots \vartheta_q^{N_I-1}]^T. \quad (1.27)$$

In order to isolate the transmitted symbols $\beta = [\beta_0, \ldots, \beta_{N_I-1}]$, the definition of trajectory coefficients (1.18) is used to rewrite:

$$\vartheta = \begin{bmatrix} D(\Gamma\alpha_0) \\ \vdots \\ D(\Gamma\alpha_{M_D-1}) \end{bmatrix} \beta = \Omega\beta \text{ where} \quad (1.28)$$

$$\alpha_q = [\alpha_{q,0}, \ldots, \alpha_{q,M_\tau-1}]^T \quad (1.29)$$

contains the channel coefficients per Doppler trajectory and $$[\Gamma]_{i,r} = \varphi_r^i, \quad (1.30)$$

r=0, 1, ... $M_\tau$−1, is the matrix with the time delay functions. By substituting (1.28) in (1.21) the following observation model is obtained:

$$y = \Psi\Omega\beta + w. \quad (1.31)$$

This last expression can be interpreted in the following manner: the a priori information of system design is concentrated in the constant VT matrix $\Psi$, while the stochastic behavior of the channel is captured by $\Omega$. The inner vectors in diagonal matrices of $\Omega$ are the channel transfer functions (CTF) belonging to each of the $M_D$ VTs. Interestingly, the term $\Gamma\alpha_q$ represents an 1D BEM in frequency domain. Assuming that channel state information $\alpha_q$ is available, the only unknown term in (1.31) is vector $\beta$, which can be estimated through linear minimum mean squared error algorithm (LMMSE):

$$\bar{\beta} = (\Omega^H\Psi^H\Psi\Omega + \sigma_w^2 I)^{-1}\Omega^H\Psi^H y. \quad (1.32)$$

Taking into account that CE process requires the transmission of pilot symbols, their contribution must be removed prior to EQ.

The solution in (1.32) while optimal, is not practical for implementation in modems, since the computational complexity required by the matrix inverse is too high. Instead of looking for algorithms designed to solve problems with banded matrices, the virtual-trajectory structure can be used to obtain a sub-optimal estimate using combining techniques. Given that $\Psi$ is a system-design constant, problems related to its pseudo inverse can be handled off-line. The latter enables the Rx to use the precomputed and stored Moore-Penrose pseudoinverse:

$$\Psi^\dagger = (\Psi^H \Psi)^{-1} \Psi^H, \quad (1.33)$$

without any realization dependent ill-conditioning. This preprocessing applied to (1.31) provides a least-squares (LS) estimate of the subcarrier coefficient per VT as:

$$\hat{\vartheta} = \bar{y} = \Psi^\dagger y = \Psi^\dagger \Psi \Omega \beta + \Psi^\dagger w = \Box \Omega \beta + \bar{w} \quad (1.34)$$

which we call VT estimation. This expression has the convenient diagonalized form due to the structure of matrix $\Omega$ at the expense of obtaining colored noise component $\bar{w}$ with covariance matrix $R\bar{w} = \sigma_w^2 (\Psi^H \Psi))^{-1}$. At this point, some optimality is sacrificed by truncating the noise correlation matrix as:

$$R_{\bar{w}} = \sigma_w^2 (\Psi^H \Psi)^{-1} \quad (1.35)$$

$$\approx \frac{\sigma_w^2}{N_I M_D} tr\{(\Psi^H \Psi)^{-1}\} I_{N_I M_D} \quad (1.36)$$

$$\approx \sigma_{\bar{w}}^2 I_{N_I M_D}$$

i.e., the colored noise is approximated by white Gaussian with equal average power. The performance cost of this assumption depends on the particular structure of the VT matrix $\Psi$. If the columns tend to orthogonallity, the output noise becomes uncorrelated. Particularly, the orthogonallity between VTs of the same symbol given by the modulated DPSS implies that their noise contribution is uncorrelated. From (1.28) and (1.36), (1.35) can be decomposed without any extra losses in $N_D$ observation equations, one for each data symbol $\beta_d$. Each group of trajectory coefficients belonging to the same information symbol forms a single-input multiple-output model:

$$\bar{y}_d = \beta_d \omega_d + \bar{w}_d, \{\beta_d | d \in I\}, \quad (1.37)$$

where $$\bar{y}_d = [\bar{y}[d] \bar{y}[d+N_I] \ldots \bar{y}[d+(M_D-1)N_I]]^T, \quad (1.38)$$

$$\bar{w}_d = [w[d] w[d+N_I] \ldots w[d+(M_D-1)N_I]]^T, \quad (1.39)$$

$$\omega_d = [[\Omega]_{d,d}, [\Omega]_{d+N_I,d}, \ldots, [\Omega]_{d+(M_D-1)N_I,d}]^T \quad (1.40)$$

and I is the subset of data indexes with size $N_D$. Using the LMMSE estimator for $\beta_d$ in (1.37) leads to the sub-optimal:

$$\hat{\beta}_d = (\omega_d^H \omega_d + \sigma_{\bar{w}}^2)^{-1} \omega_d^H \bar{y}_d \quad (1.41)$$

$$\beta_d = \frac{\sum_{q=0}^{M_D-1} \hat{\vartheta}_q^d \eta_q^d}{\sigma_{\bar{w}}^2 + \sum_{q=0}^{M_D-1} |\eta_q^d|^2}, \quad (1.42)$$

with $\eta_q^d = [\Omega]_{d+qN_I,d}$. From (1.42) it is easy to see that our VT modeling allows the decomposition of the double selective channel into $M_D$ wideband time-invariant channels that exploit Doppler diversity. After VT pre-processing in (1.34) the VT contributions are used to perform maximal ratio combining and obtain a single estimate per symbol. The computational savings of this approach with respect to any of the state-of-the-art solutions is high, since one-tap EQ is much less complex than block-wise solvers.

Estimation of Channel Parameters.

In order to make a proper estimation of information symbols using (1.42), the channel parameters need to be estimated. Following the VT philosophy, estimates of the transfer function in each VT can be obtained with low computational complexity. By using definitions (1.27) and (1.18) it is possible to construct the following linear model:

$$\vartheta_q = D(\beta) \sigma \alpha_q, \quad (1.43)$$

with the channel coefficients for the q-th Doppler trajectory $\alpha_q$ defined in (1.29), The expression in (1.43) implies that each of the $M_D$ vectors $\vartheta_q$ can be treated as a conventional OFDM system over frequency selective non time-varying channels. The time delay BEM allows channel estimation per Doppler trajectory to be performed using conventional 1D BEM CTF estimation techniques [23] Assume that from the set of transmitted symbols $\{\beta_i | i \in 0, 1, \ldots, N_I-1\}$ a subset $\{\beta_p, |p \in P\}$, where P is a set of pilot indexes, contains symbols known by the Rx. Taking advantage of the diagonalized form of (1.45), and using the subcarrier coefficients per VT from (1.34), the observation model for the pilot symbols is:

$$\vartheta_q^P = D(\beta^P) \Gamma^P \alpha_q, \quad (1.44)$$

where $\vartheta_q^P$ is a vector formed by the elements of $\vartheta_q$ at pilot positions, $\Gamma^P$ is made with the rows of $\Gamma$ at pilot positions, and $\beta^P$ is the vector with transmitted pilots.

The estimate of channel parameters can then be obtained through LS algorithm:

$$\hat{\alpha}_q = (\Gamma^P)^\dagger D(\beta^P)^{-1} \hat{\varepsilon}_q^P. \quad (1.45)$$

Taking the estimated BEM coefficients, the required CTFs per VT sampled in the data indexes can be completely obtained through:

$$\hat{\eta}_q^I = \Gamma^I (\Gamma^P)^\dagger D(\beta^P)^{-1} \hat{\vartheta}_q^P \quad (1.46)$$

$$= \Lambda \hat{\vartheta}_q^P,$$

where $\Lambda \Box \Gamma^I (\Gamma^P)^\dagger D(\beta^P)^{-1}$ can be computed and stored off-line in the Rx, $\Gamma^I$ is made with the rows of $\Gamma$ at data positions and $\hat{\eta}_q^I = \Gamma^I \hat{\alpha}_q$. In order to avoid ill-conditioning of (1.45), at least $M_\tau$ pilot symbols should be sent. Depending on the noise and interference levels, a greater number of pilots might be needed.

Estimating the set of $M_D$ vectors a is sufficient to obtain a complete parameterized characterization of the channel during the current block. Note that the same transmitted pilots ($M_\tau$ as minimum) provide enough training for the entire set of parameters $$\{\alpha_{q,r} | q \in [0, M_D-1], r \in [0, M_\tau-1]\}.$$

DFT Spreading.

Even with high SNR, CP-OFDM systems are susceptible to detection errors because the local power for some subcarriers is subject to deep fades. For the proposed system, it is possible to trust that Doppler diversity could compensate for this problem in the combining stage if different trajectories experiment uncorrelated CTF. However, homogeneity of power distribution in each Doppler trajectory is not guaranteed. Due to this, instant signal power is mainly dominated by $\eta_1$, and the received carriers still suffer from correlated fading.

Considering that the proposed Rx makes use of linear estimators instead of constellation-dependent detectors, it is capable of carrying any complex vector $\beta \in \square^{N_D}$, i.e., it is not limited to finite constellations, allowing linear coding to be used. The Fourier matrix F with:

$$[F]_{m,m'} = \frac{1}{\sqrt{R}} e^{(-j2\pi m'm/R)}, m, m' = [0, \ldots, R-1] \quad (1.47)$$

is the preferred coder/decoder for the following two reasons:
1. Structure of complex exponential sequences implies that each information symbol at the input distributes its energy uniformly over the entire output vector bandwidth. With this, deep fades are spread across the entire bandwidth and no particular data symbols are greatly affected. This process whitens the channel and helps each data symbol to experiment SNR close to the average.
2. Coding and decoding processes can be performed by using the FFT algorithm, which has reduced complexity O $(N_D \log_2 N_D)$.

Better results can be obtained if the coding process is performed over a number of information symbols greater than amount of symbols in one block, i.e., $R>N_D$ in such a way that artificial block length is larger than the channel correlation time. Note that an increase in the coding-block size implies larger sizes in the FFT coders, but since the total bits per coding-block is also increased, the computational complexity grows as O $(R \log_2(R))$.

Incoherent Embodiment

In order to achieve incoherent reception, the transmitter requires a differential coding stage prior carrier modulation. The information bits are mapped to m-ary PSK complex constellation symbols $d_i$, after this, the differential encoder follows the recursion rule:

$$\beta_i = \beta_{(i-1)} d_i \quad (1.48)$$

Similarly to a FD-DOFDM system, for a total of $N_D$ carriers, only $N_D-1$ information symbols can be transmitted per block (the first subcarrier is used as reference only). Differential encoding is performed individually on each block so that, there is no inter block dependency.

Phase Difference Estimation.

Based on the structure of the differential encoder, an incoherent detector is proposed in the following. Using (1.34) the output of the virtual trajectory estimator for each Doppler component can be expressed as (1.18):

$$\vartheta_q = D(\beta) \Gamma \alpha_q = D(\beta) \eta_q \quad (1.49)$$

where $\eta_q = [\eta_q[0] \ldots \eta_q[N_D-1]]^T$. The last expression remains the I/O model of SC DPSK signals under Rayleigh fading; note that $\eta_q$ can also be assumed with Rayleigh distribution. Any of the known DPSK detection techniques can be applied (ML, spherical decoding, BEM spherical decoding, e.g.), yet combining should be included prior symbol or bit decision in order to exploit the diversity gains properly.

Uncoded VT-DPSK Detection.

Given that each of the Doppler trajectories is treated separately, the channel representation of interest is the complex gain coefficient $\eta_q[i]$ as it represents the CTF for the i-th subcarrier in the q-th Doppler trajectory. Its autocorrelation function is then computed as:

$$R_{\eta_q \eta_q} = E\langle \Gamma \alpha_q \alpha_q^H \propto^H \rangle = \Gamma R_{\alpha_q \alpha_q} H \Gamma H \quad (1.50)$$

Note that by using an autocorrelation function, time stationarity is assumed for simplicity and as an anticipated result due to the BEM of the CTF. However the present model approximates non-stationary channels in the short-time local statistics.

For the special case of uncorrelated scattering without shape/match filters, the delay-time BEM converges to the canonical form with covariance matrix:

$$R_{\alpha_q \alpha_q} = D\{p_q\}, \quad (1.51)$$

where $p_q$ is the power delay profile of the q-th virtual trajectory. Recalling that $\Gamma$ is composed by the time-delay BEM in frequency domain, (1.50) and (1.51) imply that in this particular WSSUS scenario the covariance matrix in each virtual trajectory is an scaled and $M_D$ compressed version of the channel frequency covariance.

Autocorrelation DPSK Detector.

The AC detector as mentioned previously, is the one with lower computational complexity, the detection rule is:

$$\hat{d}_q[i] = \vartheta_q^i \vartheta_{q-1}^{i*} = \vartheta_q[i] \vartheta_{q-1}^*[i] \quad (1.52)$$

Once the $M_D$ phase differences per data symbol have been estimated, the following step is to use a combining rule. For the Rayleigh case with uncorrelated virtual trajectories, maximum ratio combining offers the best results, applied in the form:

$$\hat{d}_i = \arg\max_{d \in T} \left\{ \text{Real} \left\{ d^* \sum_{q=0}^{M_D-1} \vartheta_q[i] \vartheta_{q-1}^*[i] \right\} \right\} \quad (1.53)$$

$$= \arg\max_{d \in T} \left\{ \text{Real} \left\{ d^* \sum_{q=0}^{M_D-1} \hat{d}_q[i] \right\} \right\} \quad (1.54)$$

where T is the set of symbols belonging to the Tx constellation. When compared with the coherent receiver, the incoherent option skips the channel estimation stages, has a simpler equalization (phase difference estimation for this case), and saves complexity given that no divisions are necessary in the combiner (only additions).

ML DPSK Detector.

The ML algorithm as in (1.54) can provide a solution of lower computational complexity is the sequence is processed using a sliding window of size $N_T$. This can be implemented by means of the detection rule:

$$d_k = \arg\max_{d \in T} \left\{ \sum_{q=0}^{M_D-1} (D\{\vartheta_q^k\} s_q^*)^H L_q L_q^H D\{\vartheta_q^k\} s_q^* \right\} \text{ where} \quad (1.55)$$

$$\vartheta_q^k = [\vartheta_q[k-N_T/2] \ldots \vartheta_q[k] \ldots \vartheta_q[k+N_T/2]]^T \quad (1.56)$$

and $L_q$ is a lower triangular matrix from the Cholesky decomposition of $R_{72_q}$. The sliding window length and step sizes depend on the desired trade-off between performance and computational complexity, which strongly depends also on the constellation size.

Architecture of the Embodiment with Coherent Detection

The transmitter's architecture is shown in the FIG. 1. The modulator 101 receives the data bit stream and converts it into complex symbols with a selected constellation (BPSK, QAM, MPSK, etc.), the output of this block is fed to the optional DFT-spreading precoder 102. It is important to clarify that this precoder has a buffering stage with size depending on the length of the coding blocks. The coded blocks are fed to the module 103 that performs serial to parallel grouping in block of size $N_D$. This block along with the training pilots 104 (either pre-storage or generated in execution time) are taken to the mapping module 105, that positions pilot and data according to a specific pattern in accordance to (1.20), the result is then sent to the input of the IFFT module 106. The output of this module with size N is concatenated with a cyclic prefix 107. The resulting block is converted from parallel to serial in 108 and sent to the analog interface 109. This interface can comprise any coupling to the carrier signal such as radio, high frequency, ultra high frequency and visible electromagnetic waves; acoustic waves can also be used.

Figure 2:
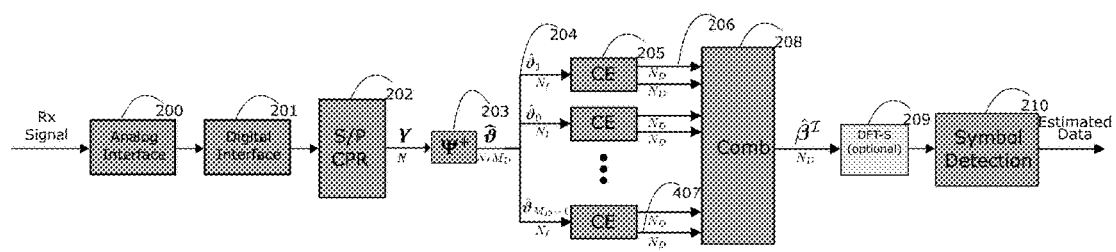
Figure 3:
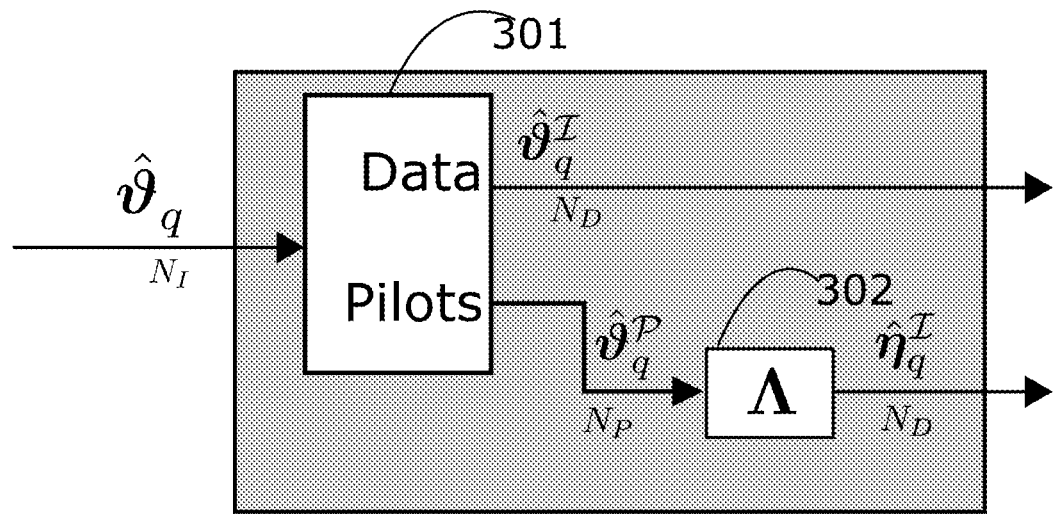

The structure of the receiver for the coherent embodiment is shown in FIG. 2. The signal from the propagation media is sent to the analog coupling 200 that makes the proper conditioning in order to send the signal to the digital interface 201 that outputs digital samples with the complex base band representation. These digital samples are then grouped in blocks of size $N_D+N_G$ so that cycle prefix can be easily discarded in 202. The resultant block is then passed to the input of the virtual trajectory separator 203. The output of this module is composed by a block with the $M_D$ virtual trajectories for each one of the $N_I$ subcarriers. The result is then split in $M_D$ sub-blocks of size $N_i$ corresponding to its respective Doppler BEM function. The virtual channel transfer functions are then estimated for each block 204 independently in 205. The inner structure of 205 is show in the FIG. 3. The input if sent to a selector module 301 that separates the incoming block in two outputs: one with the samples in the pilot positions and the other with the data samples.

Figure 4:
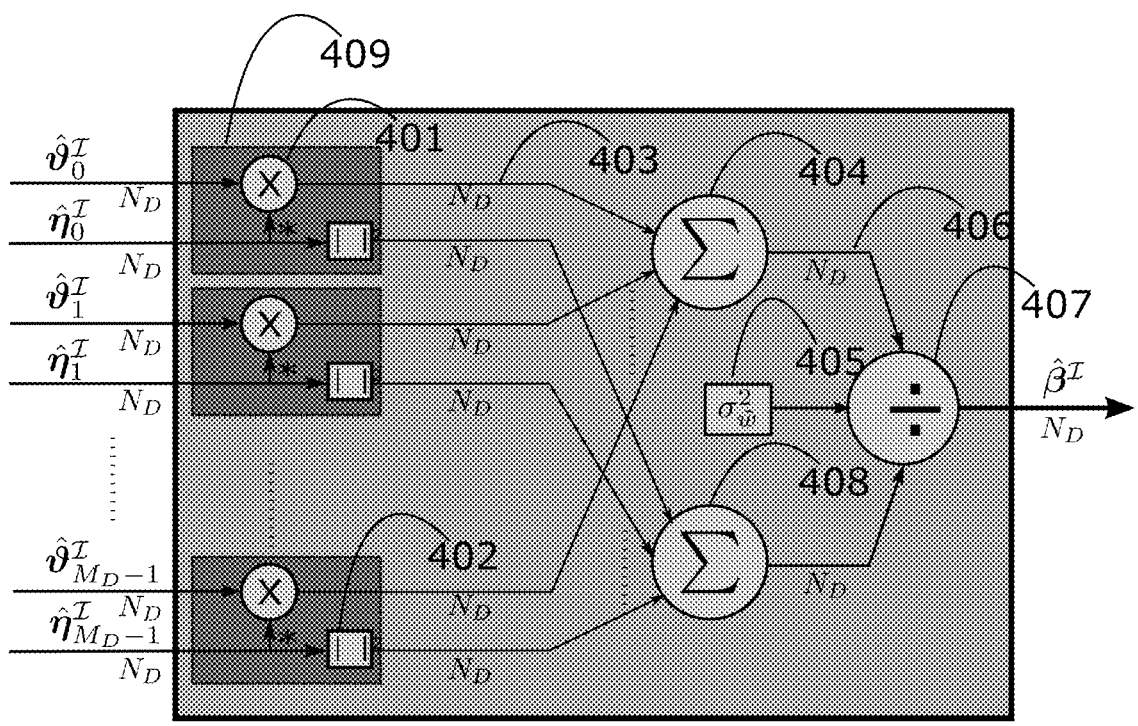
FIG. 4. Shows a block diagram with the virtual trajectories combining module

The pilot samples are used by the parameter estimator 302, which performs a matrix-vector product. The outputs from the parameter estimator and the block with the data samples are sent to the combiner module 208. The inner structure of the combiner is shown in the FIG. 4. The first stage 409 performs Hadamard product 401 between each block of samples and the complex conjugate of its corresponding virtual channel transfer function. The absolute value of each virtual CTF is obtained in 402. The output from the entire set of branches are injected to two summation modules, the first 404, takes the results from 401 and the second 408 takes the outputs from 402. The output of 404 is then divided sample by sample with the output of 408 with an offset corresponding to the noise variance in 405. Such value can be either estimated or preloaded accordingly to the specific application. Finally the output of 407 is sent as the output of 208. The result is taken by the optional DFT-spreading decoder 209 that provides the estimates samples to the bit detector 210.

Architecture of the Embodiment with Incoherent Detection

Figure 5:
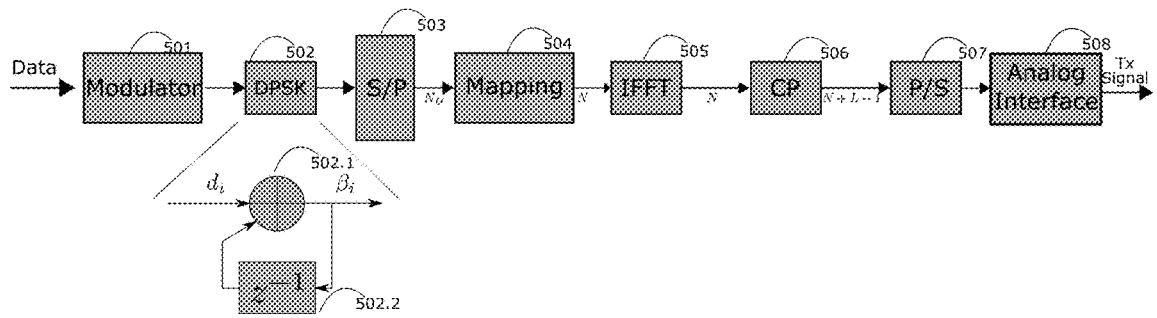
FIG. 5. Shows a block diagram with the proposed incoherent transmitter

The structure of the transmitter in the incoherent embodiment is shown in the FIG. 5. The modulator 501 receives the data stream and converts it into symbols of the selected complex constellation (BPSK, 4 PSK, 8 PSK etc.), the output of this module is sent to the differential encoder 502. This coder operates as in (1.48), where the delay register 502.2 initial value is 1. The encoded symbols are sent to the serial-parallel 503 conversion module that groups samples on its input into blocks of length $N_D$ at the output. The resultant blocks are taken by the mapping module 504 that positions the symbols according to (1.20). The output of this module is directly connected to the IFFT processor 505 that provides blocks of length N, a cyclic prefix is attached to each block by 506 and its output is passed to a parallel-serial conversion 507 which sends its output to the analog interface 508. This interface can comprise any coupling to the carrier signal such as radio, high frequency, ultra high frequency and visible electromagnetic waves; any other type of carriers such as acoustic or light waves can also be used.

Figure 6:
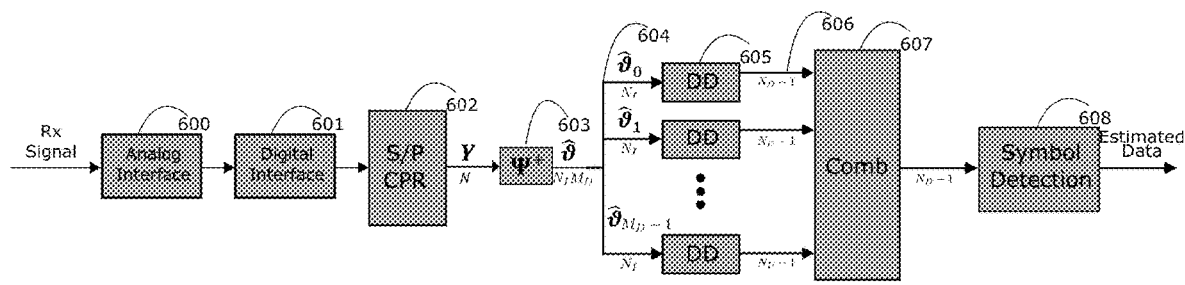
FIG. 6. Shows a block diagram with the proposed incoherent receiver of virtual trajectories FIG. 7. Shows the performance of the proposed coherent VT receiver in comparison with the LMMSE equalizer FIG. 8. Shows the performance of the VT channel estimator in the proposed coherent system FIG. 9. Shows the performance of the proposed coherent system in comparison with a conventional OFDM receiver FIG. 10. Shows the performance of the proposed coherent system on channels with different Doppler dispersion.

The structure of the receiver for the incoherent embodiment is shown in FIG. 6. The signal from the propagation media is sent to the analog coupling 600 that makes the proper conditioning in order to send the signal to the digital interface 601 that outputs signal samples with the complex base band representation. These digital samples are then grouped in blocks of size $N_D+N_G$ so that cycle prefix can be easily discarded in 602. The resultant block is then passed to the input of the virtual trajectory separator 603. The output of this module is composed by a block with the $M_D$ virtual trajectories for each one of the $N_I$ subcarriers. The result is then separated in $M_D$ sub-blocks of size $N_i$ corresponding to its respective Doppler BEM function. The detection modules 605 to 608 work differently depending on the implemented differential detector.

In the case of the autocovariance detector, the module 605 performs an autocorrelation and sends the estimated phase difference in 606 for each of the subcarriers and for all the virtual trajectories. After that, the combining module 607 performs the summations of the estimates for each VT producing a single estimate per subcarrier. Finally, this estimated phase difference is processed by a detector 608 that computes the nearest PSK symbol and its corresponding mapping bits.

In the case of the ML detector, the DD block 605 performs the computation of the likelihood in (1.55), in this case the output of each branch is of length $N_K(N_D-1)$ with $N_K$ being the constellation size. The metrics of each VT are then added up in 607 resulting in $N_K(N_D-1)$ metrics. The detector 608 identifies the symbol with the highest metric an maps its corresponding bit sequence in the output.

Note that the transmitter here described holds the basic structure of a FD-OFDM transmitter, being the only change the modification to the subcarrier allocation rules. The receiver is composed by 2 main stages. The estimation of the VT coefficients and the incoherent detection of the DPSK encoded data. It is also important to highlight that in this patent only the methods of incoherent detection of phase differences were exemplified, not being these the main contribution of the invention. In this way, any embodiment with the proposed VT separator along with any differential detector is provided and obviated as a part of the same invention.

Performance.

Figure 7:
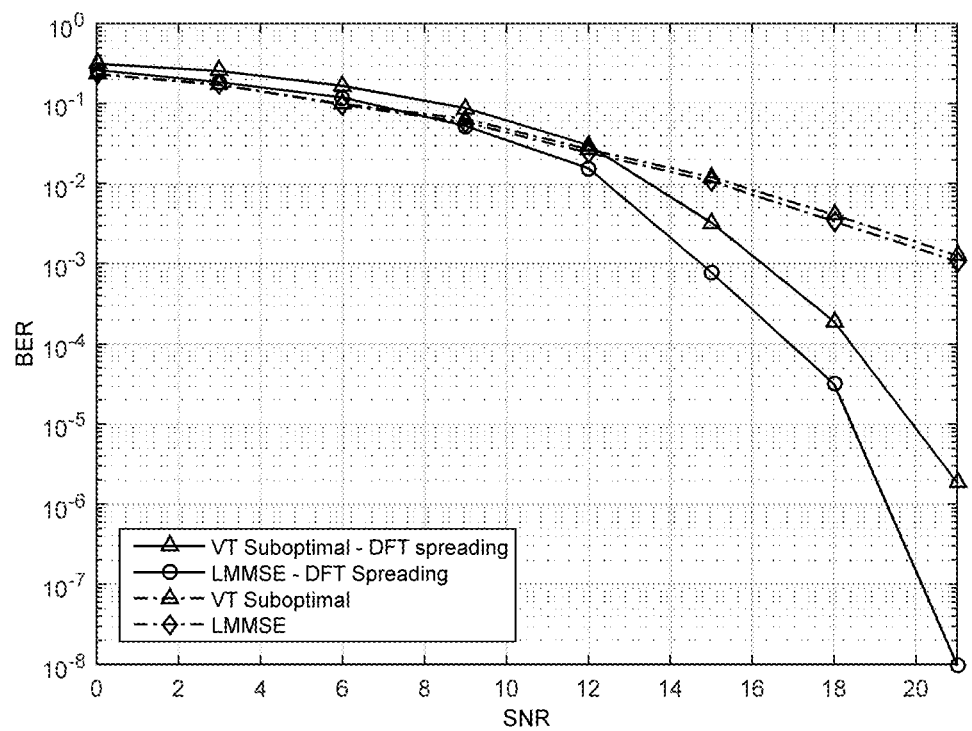

We compared the performance of the LMMSE optimal equalizer and the suboptimal low complexity VT (SVT) coherent detector proposed here. The channel parameters are $L=16$, $f_D=1000$ Hz and $T_S=1$ μs. Discrete taps in the CIR follow Jakes' fading with covariance $\|h[n,l]\|^2=1/L$. The proposed system has $N_D=N_I=128$ transmitted subcarriers using an 8QAM constellation. The Rx BEM is configured with $M_\tau=L$ and $M_D=2$ for a total block length of $N+CP=271$. The results are presented in terms of SNR, defined as:

$$SNR = \frac{E\left\{\left\|\sum_{l=0}^{L-1} h[n, l]x[(n-l)_N]\right\|^2\right\}}{E\{\|w[n]\|^2\}},\quad (1.57)$$

and the bit error rate (BER). As shown in FIG. 7, the performance loss of the proposed SVT equalizer is about 1 dB from the optimal LMMSE approach, this result is of great relevance when considering the computational savings.

Figure 8:
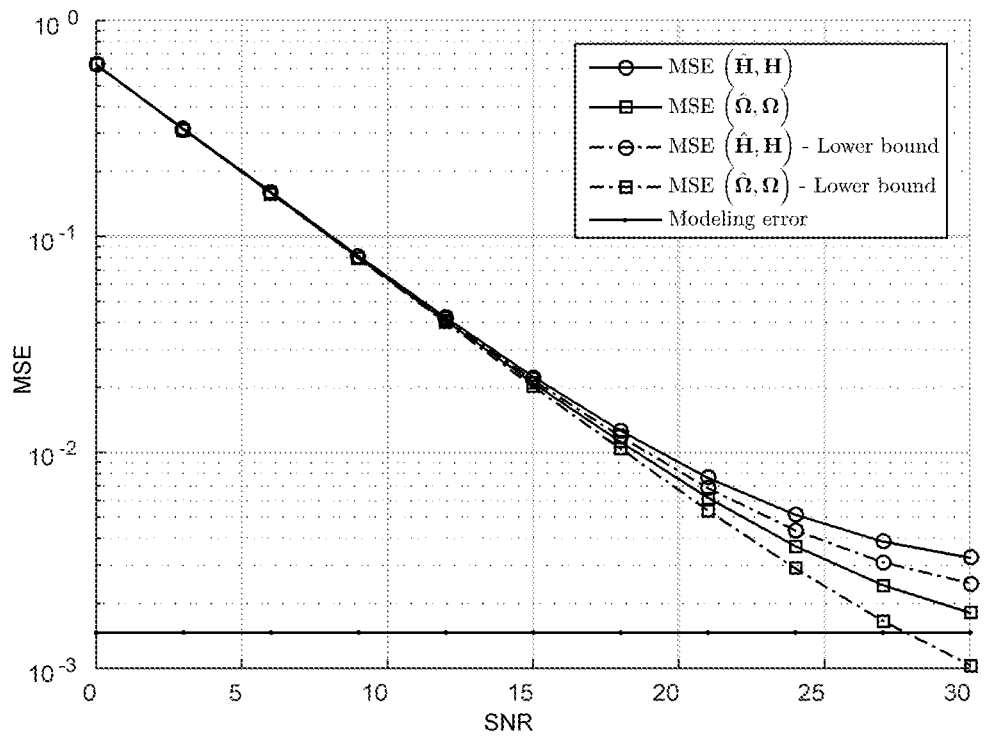

FIG. 8 shows the performance of the proposed VT-CTF estimator in terms of MSE in the BEM representation as well as in the CIR. The curve uniformly nears the lower bound. The slope reduces as the error in the CIR nears the modeling error, which leads to the conclusion that such a BEM error is not relevant in the low to medium SNR levels.

Figure 9:
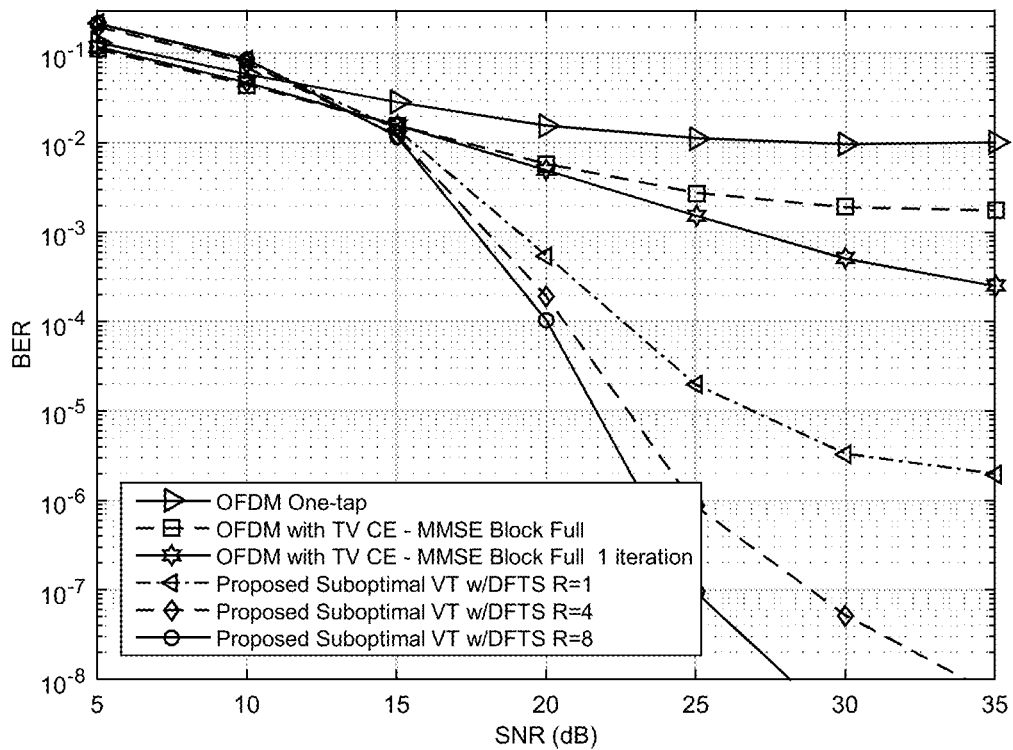

FIG. 9 shows the proposed approach compared with an OFDM system involving the CE in [5] and LMMSE equalizer. The channel parameters are the same as those used for the previous experiment. The OFDM system was configured with N=256, CP=8, $N_P$=21, $N_D$=111 and 4 guard band subcarriers. Each pilot has three times more power than the data carriers and is composed using frequency domain Kronecker delta arrays, i.e., two guard subcarriers at each side of the pilot in order to mitigate ICI on the channel estimate. The data symbols are transmitted in QPSK, yielding a spectral efficiency of 0.85 bit/s/Hz. For the proposed system, N=256, the number of data carriers is $N_D$=112 and $N_P$=16 pilots, each with twice the power of the data. The receiver's BEM is configured with $M_\tau$=L and $M_D$=2 for a total block length of N+CP=264. Transmitted symbols are modulated with QPSK, yielding a spectral efficiency of 0.84 bit/s/Hz. When the DFT spreading is applied, the coder length is R=4 $N_D$.

This scenario is more balanced since both approaches include channel uncertainties inherited from state-of-the-art CEs. The results show that the proposed approach behaves similarly to those cases with CSI, obtaining a diversity gain. Note that because of the sensitivity to the ICI in pilots, the conventional OFDM wastes more in training, diminishing the efficiency gap with the proposed system. From the results, it is important to highlight two things: First, the proposed VT-based system attains better performance than state-of-the-art OFDM receivers, while at the same time requiring much lower computational complexity. Second, The selection of linear equalizers proved to be a suitable option if coupled with DFT spreading, providing very high performance improvements overall.

Figure 10:
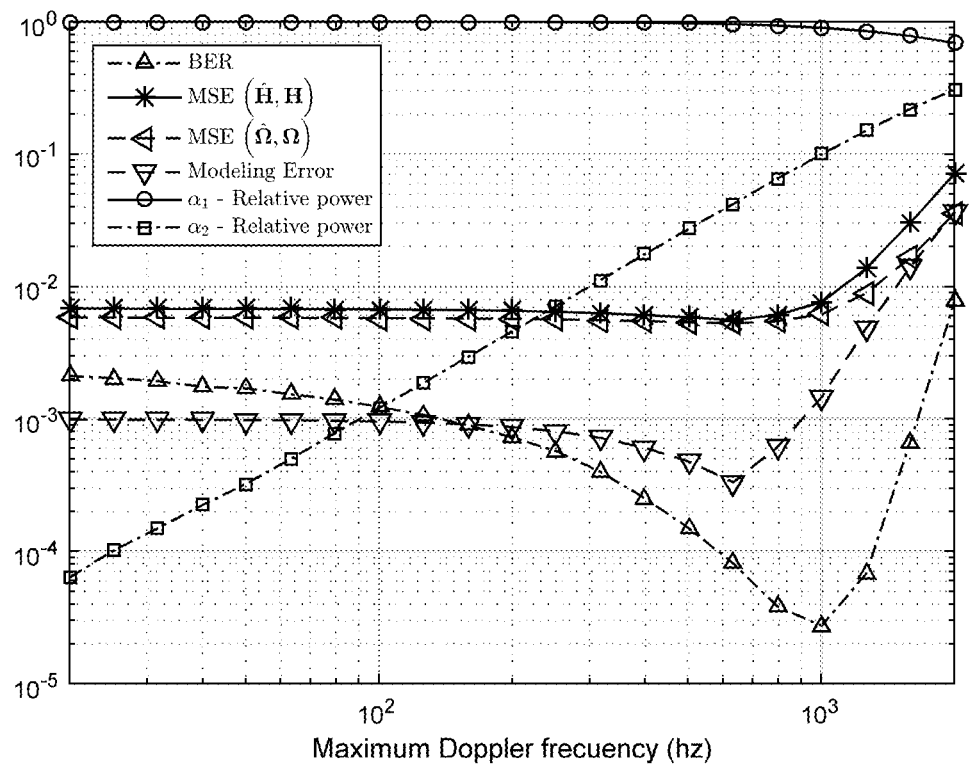

Some observations can be made from the results shown in FIG. 10. First, the modeling error as well as the CE error remain remarkably stable and with low values under the supported region. As a consequence of the available diversity, the BER decreases with the increase in power of the second trajectory. This behavior is maintained to the maximum point near $f_D$=1 kHz (system design bound), where the modeling error then impacts the overall system performance. This behavior shows that the performance in the low-Doppler region is lower because of the reduced Doppler diversity. Taking advantage of the compatibility with conventional OFDM, a practical solution can include a hybrid system: which can commute between classic OFDM for time-invariant channels and the proposed configuration in high Doppler scenarios.

The proposed incoherent system is next compared with a conventional OFDM. The channel parameters are L=9, $f_d$=937 Hz and $T_S$=1 μs. Discrete taps in the CIR follow Jake's fading with PDP $E\{|h[n,l]|^2\}=\lambda e^{-0.61}$ where $\lambda$ is a unitary power normalization constant. The OFDM system is configured with 128 subcarriers, 96 of them active, CP length L−1 and QPSK symbols, yielding a spectral efficiency of 1.40 b/hz/s. For the proposed incoherent system, $N_I$=$N_D$=128, the BEM is configured with $M_\tau$=L and $M_D$=2 for a total block length N+CP=264. Symbols are modulated with 8 PSK constellation which yields SE of 1.44 b/hz/s. The proposed coherent system has $N_D$=120 and $N_P$=8 pilots and 8-QAM constellation yielding SE of 1.38 b/hz/s, the remaining parameters are the same as those for the incoherent system.

Figure 11:
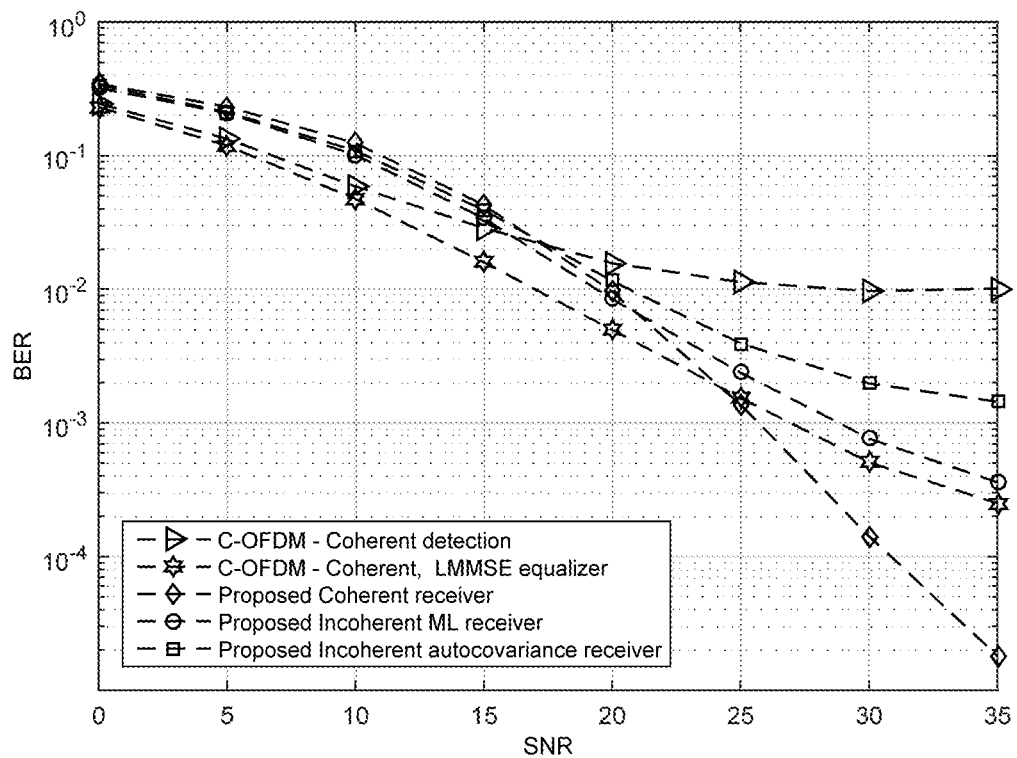
FIG. 11. Shows the performance comparison between the coherent, incoherent VT proposed embodiments and OFDM receiver using a time-varying channel receiver.

As shown in FIG. 11 the performance in the low-SNR is pretty close among all the techniques. Note that compared with the conventional receiver that does not support time variability, the performance of the proposed receiver after 15 dB is higher. The performance also behaves very close to the OFDM with algorithms for time varying channels, this is a remarkable result since the computational complexity difference is very high. Finally the lower performance on the low SNR regime is explained by the increased constellation size, in that region the white noise stays above the ICI. This is not a problem since, by reducing the constellations size, all the approaches get better BER in that region at the time the crossing point moves towards 0 dB.

Next we compare our VT incoherent receiver with the linear precoding (LP) based in [17]. The channel parameters are L=2, $f_D$=810 and $T_S$=1 Mhz. Discrete taps in the CIR follows Jake's fading with covariance $\|h[n,l]\|^2$=1/L. The LP is configured with (N, P, M, K)=(1260, 60, 6, 3) so that SE is 0.843 b/Hz/s. The proposed system is configured with N=256, $M_D$=2, CP=1 and $N_I$=$N_D$+1=126. An additional stage of frequency diversity is attached. The data is transmitted with 2 order redundancy on different subcarries, this yields SE of 0.73 b/Hz/s.

Figure 12:
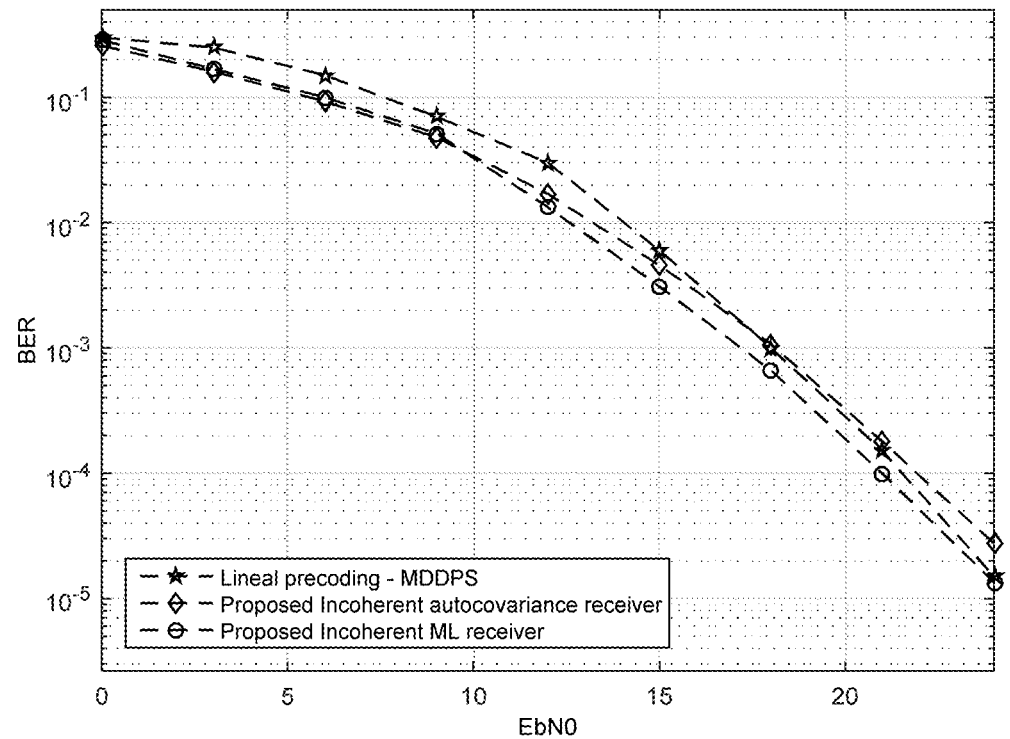
FIG. 12. Shows the comparison of the proposed incoherent receiver and the MDDPS

The results in FIG. 12 show that the proposed VT DPSK receiver has similar performance with that of [17]. Although, the VT DPSK approach seems and attractive solution since has less complex detector, much less latency (because of the shorter block size) and mainly, it is fully compatible with conventional OFDM DPSK systems.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

REFERENCES

1. Y. Mostofi, et. al. IEEE Trans. Wireless Commun, vol. 4, no. 2, pp. 765-774, 2005.
2. S. Ahmed, et. al. IEEE Signal Process. Lett, vol. 13, no. 1, pp. 5-8, 2006.
3. Z. Tang, et. al. IEEE J. Sel. Areas Commun, vol. 26, no. 2, pp. 366-377, 2008.
4. P. Schniter. IEEE Trans. Signal Process, vol. 52, no. 4, pp. 1002-1011, 2004.
5. F. Pena-Campos, R. Carrasco-Alvarez, O. Longoria-Gandara, and R. Parra-Michel. IEEE Trans. Wireless Commun, vol. 12, no. 2, pp. 898-907, 2013.
6. T. Cui, et. al. ICC 2005. IEEE International Conference on Communications, vol. 3. IEEE, May 2005, pp. 1980-1984.
7. E. P. Simon, et. al. IEEE Trans. Veh. Technol., vol. 60, no. 3, pp. 955-965, 2011.
8. H. Hijazi, et. al. IEEE Trans. Commun, vol. 58, no. 1, pp. 170-178, 2010.
9. P. Wan, et. al. IEEE Trans. Veh. Technol., vol. 60, no. 8, pp. 3780-3791, 2011.
10. P. Salvo Rossi, et. al. IEEE Trans. Wireless Commun, vol. 7, no. 11, pp. 4719-4729, November 2008.
11. Y.-S. Choi, et. al. IEEE Trans. Commun, vol. 49, no. 8, pp. 1375-1387, 2001.
12. N. Al-Dhahir, et. al. IEEE Trans. Signal Process., vol. 48, no. 10, pp. 2921-2936, October 2000.
13. J. Huang, et. al. IEEE J. Sel. Topics Signal Process, vol. 5, no. 8, pp. 1524-1536, 2011.
14. S. Das, et. al. IEEE Trans. Signal Process., vol. 55, no. 12, pp. 5782-5795, 2007.
15. S. Lu, et. al. IEEE Trans. Wireless Commun, vol. 7, no. 11, pp. 4110-4116, 2008.
16. Z. Liu, et. al. IEEE Trans. Wireless Commun, vol. 2, no. 3, pp. 420-423, 2003.
17. A. Cano, et. al. IEEE Trans. Commun, vol. 53, no. 12, pp. 2157-2166, 2005.
18. I. Barhumi, et. al. IEEE Trans. Signal Process., vol. 84, no. 11, pp. 2055-2066, 2004.
19. D. Slepian. Bell Syst. Tech. J., vol. 43, pp. 3009-3058, 1964.

20. V. Kontorovich, S. Primak, A. Alcocer-Ochoa, and R. Parra-Michel. IET Signal Processing, vol. 2, no. 2, pp. 87-96, 2008.
21. X. Ma, et. al. IEEE Trans. Signal Process, vol. 51, no. 5, pp. 1351-1366, 2003.
22. E. Sejdic, et. al. ICASSP 2008. IEEE International Conference on Acoustics, Speech and Signal Processing, March 2008, pp. 2849-2852.
23. P. Salvo Rossi, et. al. IEEE Signal Process. Lett, vol. 15, pp. 21-24, 2008.

The invention claimed is:

1. A low complexity multicarrier communication system for doubly selective channels based on the concept of virtual trajectories comprising:
    a) a transmitter comprising a bit stream input connected to a base band modulator;
    b) said base band modulator has a discrete Fourier transform (DFT) spreading precoder connected on its output and a serial to parallel ("S/P") converter connected to said DFT spreading precoder output;
    c) said S/P converter having a subcarrier mapping module coupled to its output;
    d) an inverse fast Fourier transform ("IFFT") is coupled to the output of a subcarrier mapping module;
    e) a module that performs insertion of cyclic prefix ("CP module") connected to the output of said IFFT module;
    f) a parallel to serial ("P/S") converter coupled to the output of the CP module, and an analog module that performs digital to analog conversion, pass band modulation and amplification coupled to said P/S module and,
    g) a receiver comprising:
    h) an analog module that takes the signal from the propagation media and provides digital signals to an S/P converter;
    i) a said S/P converter has a virtual trajectory ("VT") estimator coupled to its output;
    j) said VT estimator having $M_D$ channel estimation blocks coupled to its output; and
    k) a combining module coupled to outputs of said channel estimator blocks;
    l) a DFT spreading decoder is coupled to the output of said combining module; and a detector which provides an estimated bit stream in the receiver is coupled to the DFT spreading decoder output.

2. The multicarrier communication system of claim 1, wherein said channel estimation blocks comprise:
    a) a splitter with two outputs that separates data and pilot virtual trajectory (VT) coefficients and;
    b) a module that computes channel estimation by performing matrix-vector product between the pilot VT coefficients and a pseudo inverse matrix.

3. The multicarrier communication system of claim 1, wherein said combining module operates using the maximal ratio combining algorithm, equal gain combining, or switching combining.

4. The multicarrier communication system of claim 1, where said combining module comprises the methods selected from a group consisting of equal gain combining, switching combining and any combination of these and another method.

5. The multicarrier communication system of claim 1, wherein the DFT spreading decoder is adapted to be implemented by means of any conventional or fast algorithm and can cover one transmitted block.

6. The multicarrier communication system of claim 1, where the DFT spreading decoder is adapted to be implemented by means of any conventional or fast algorithm and can cover several transmitted blocks.

7. The multicarrier communication system of claim 1, wherein said system is implemented using digital technology and said digital technology comprises field programable gate arrays (FPGAs), digital signal processors (DSPs), computers and application specific integrated circuits (ASICs).

8. The multicarrier communication system of claim 1 wherein the conditioning stages on the transmitter and receiver for a given carrier signal comprise electromagnetic waves and acoustic waves.

9. A multicarrier communication system for doubly selective channels with differential encoding and a low complexity incoherent receiver based on the concept of virtual trajectories, comprising:
    a) a transmitter that comprises:
    b) a bit stream input connected to a phase shift keying (PSK) modulator with a differential encoder connected on its output;
    c) the output of said differential encoder attached to a serial to parallel (S/P") converter;
    d) a subcarrier mapper coupled to said output S/P block;
    e) an IFFT block that performs frequency to time conversion is connected to said subcarrier mapper output;
    f) a block that performs insertion of cyclic prefix (CP) attached to the output of the IFFT block;
    g) a parallel to serial (P/S) converter coupled to the output of said CP block;
    h) an analog module that performs digital to analog conversion, and radio frequency (RF) modulation and amplification connected to said P/S output, and,
    i) a receiver that comprises:
    j) an analog module that takes the signals from propagation media and provides digital signals to a S/P converter attached to its output;
    k) said S/P convertor having a virtual trajectory (VT) estimator attached on its output; the output of said VT estimator connected to differential phase shift keying (DPSK) estimation modules;
    l) a combiner module is coupled to said DPSK estimators; and said combiner module has a detector attached to its output which provides a received bit stream.

10. The multicarrier communication system of claim 9, wherein: said virtual trajectories estimator performs least square (LS) algorithm using a pseudo inverse matrix.

11. The multicarrier communication system on claim 9, where the module of DPSK estimation is selected from a group consisting of an autocovariance detector, and a maximum likelihood detector.

12. The multicarrier communication system of claim 9, wherein said combiner module performs the combining of the phase of the signal estimated per virtual trajectory for each of the subcarriers.

13. The multicarrier communication system of claim 9, wherein said combiner module further implements a method selected from a group of maximal ratio combining, equal combing and switching combining methods.

14. The multicarrier communication system of claim 9, wherein a symbol detection module estimates a phase difference and transmitted symbol.

15. The multicarrier communication system on claim 9, where the phase difference estimation and symbol detection can be computed by means of autocovariance, ML algorithm or any combination of these.

16. The multicarrier communication system on claim 9, where any diversity encoding technique can be implemented prior DPSK modulation.

17. The multicarrier communication system of claim 9 wherein said system is implemented using digital technology and such digital technology comprises FPGAs, DSPs, computers and ASICs.

18. The multicarrier communication system of claim 9 wherein the conditioning stages on said transmitter and said receiver for a given carrier signal comprises electromagnetic waves and acoustic waves.

* * * * *